June 21, 1960 B. H. SCHULTZ ET AL 2,942,153
MEANS FOR PROTECTING SHUNT CAPACITOR BANK
Filed Jan. 9, 1958 2 Sheets-Sheet 2

Permissible 60 Cycle Overvoltage

INVENTORS.
Blaine H. Schultz
Harold C. Stone
BY Lee H. Kaiser
Attorney

United States Patent Office
2,942,153
Patented June 21, 1960

2,942,153

MEANS FOR PROTECTING SHUNT CAPACITOR BANK

Blaine H. Schultze, South Milwaukee, and Harold C. Stone, Milwaukee, Wis., assignors to McGraw-Edison Company, Milwaukee, Wis., a corporation of Delaware Filed Jan. 9, 1958, Ser. No. 707,963

11 Claims. (Cl. 317—12)

The invention relates to shunt capacitor banks for alternating current power lines and more particularly to the protection of high voltage shunt capacitor banks against damage resulting from capacitor failure.

Standard capacitor units of the type used for power factor connection cannot safely be subjected to continuous overvoltage in excess of 10% of the rated voltage, and when sufficient capacitor failures have occurred in a series group of a shunt capacitor bank to cause the voltage on the remaining units to exceed 110% of the rated voltage, industry standards recommend that the bank be removed from the power system and the failed units replaced. In order to provide satisfactory protection against overvoltage caused by capacitor unit failure, it is generally recommended that a certain minimum size bank must be adhered to. This minimum size bank is based, among other reasons, on the premise that one capacitor unit in any series group may fail without causing an overvoltage in excess of 10% of rated voltage on the remaining units of that series group, and it is the practice in the industry to limit such overvoltage on the remaining units to less than 10% of rated voltage by utilizing a minimum predetermined number of capacitor units in parallel in each series group. However, this requirement of a minimum number of capacitor units per series group often necessitates a capacitor bank of greater kilovar capacity than required to provide the desired power factor correction.

It is an object of the invention to provide completely protected shunt capacitor banks for alternating current power systems in smaller kilovar sizes than heretofore recommended.

It is a further object of the invention to provide shunt capacitor bank protective means which will permit use of fewer paralleled capacitor units per series group than the number followed by industry practice without causing overvoltage, in the event of capacitor failure, which may damage the remaining capacitor units.

It is a still further object of the invention to provide capacitor bank protecting means which will permit the capacitor bank to continue to deliver, without damage to the remaining capacitors, required kilovars during peak load periods, even after capacitor failure which has resulted in overvoltage greater than 10% of rated voltage on the remaining capacitor units, and to permit removal of the faulted capacitors during off-peak load periods.

These and other objects and advantages of the invention will be apparent from the following description when taken in conjunction with the accompanying drawing wherein.

When the fuse blows on a capacitor unit of a shunt capacitor bank having series groups of paralleled capacitors, the impedance of the series group containing the faulted capacitor increases so that the voltage increases across this series group and decreases across other series groups. Standard power factor correction capacitor units cannot safely be subjected to a continuous overvoltage of more than 10% of rated voltage, and heretofore it has been considered necessary to provide unbalance detecting protective means which will disconnect the capacitor bank from the power system when the voltage across any series group exceeds 110% of the rated voltage.

It is industry practice to provide a sufficient number of paralleled capacitor units in each series group so that one capacitor unit can be removed without causing an overvoltage in excess of 10% of rated voltage on the remaining capacitors. This practice permits operation of the capacitor banks without damage to the capacitor units even though a single unit in any series group has failed or been removed, but such construction requires a predetermined minimum number of capacitor units to be included in the bank which may necessitate greater kilovar capacity for the bank than necessary to provide the desired power factor correction. This limitation is particularly serious since the recent introduction of capacitor units of 50 kilovar size.

Figure 3:
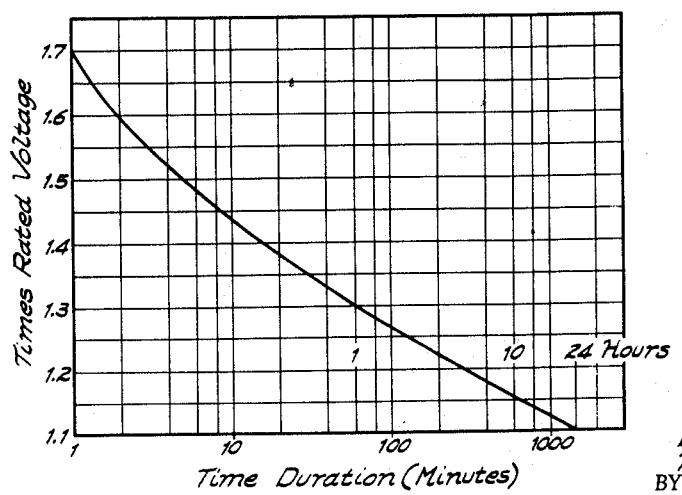

As shown in Fig. 3, a standard capacitor unit of the type used for power factor correction can safely withstand overvoltage in excess of 10% of rated voltage for short durations, and advantage is taken of this characteristic in the present invention to provide a completely protected capacitor bank having in each series group a number of paralleled capacitor units less than the recommended minimum number which would limit overvoltage on the group to 10% of rated voltage in the event a single capacitor unit fails or is removed.

Figure 1:
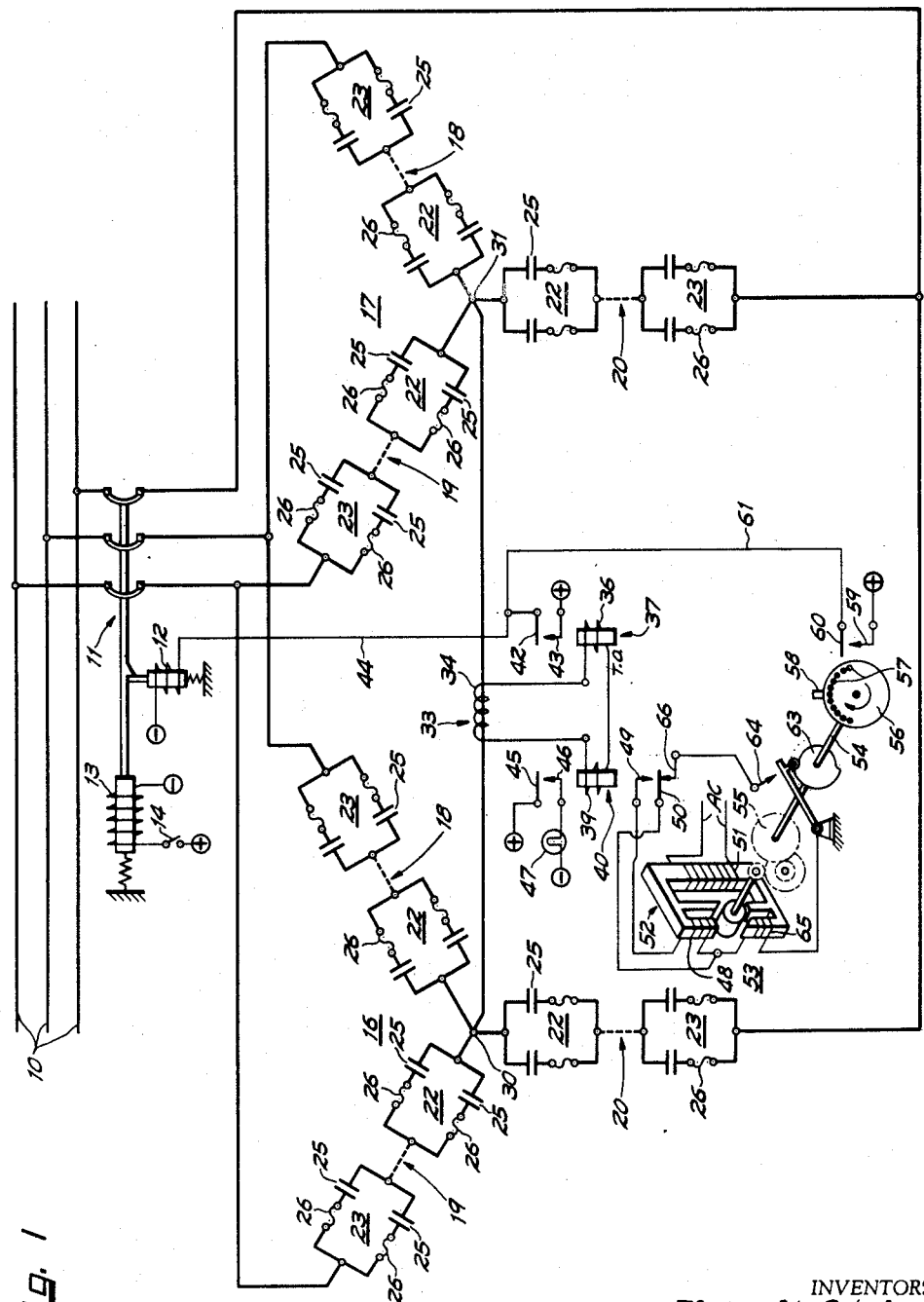
Fig. 1 is a schematic circuit diagram of an ungrounded neutral, split Y capacitor bank provided with a preferred embodiment of the invention.

The invention is illustrated in Fig. 1 applied to a three phase, high voltage shunt capacitor bank of the floating neutral, split Y type which is connected to a three phase alternating current transmission or distribution line 10 by a circuit breaker 11 having a trip coil 12 and a closing coil 13 which may be controlled manually by a switch 14 or automatically in any desired manner. The two halves 16 and 17 of the split Y bank are identical, and further the three phases 18, 19 and 20 of each bank half 16 and 17 are identical. As shown in the drawing each phase 18, 19 and 20 comprises two capacitor groups 22 and 23 connected in series, but it will be appreciated that any desired number of series groups may be utilized to permit use of capacitor units of standard voltage rating in series across the voltage of power system 10.

Each group 22 and 23 consists of a suitable number of standard capacitor units 25 connected in parallel, and each capacitor unit 25 is provided with an individual fuse 26. It will be understood that although only two paralleled capacitor units 25 are shown in the drawing in each series group 22 and 23, in an actual installation there will usually be a relatively large number of capacitor units 25 in each series group 22 and 23, but in accordance with the invention this number of paralleled capacitor units 25 in each series group 22 and 23 may be less than the minimum number established by industry practice. For example, for a split Y bank with seven series groups, it is the practice in the industry to utilize a minimum of ten capacitor units in parallel in each series group in order to prevent the overvoltage on the remaining units from exceeding 10% of rated voltage when one capacitor unit in the series group fails. Thus the minimum size of bank utilizing 50 kilovar units would be 10×50×7=3500 connected kilovars per phase in each half of the split capacitor bank, which may be too large to be economically feasible for the installation. In accordance with the invention the number of capacitor units 25 in parallel in each series group 22 and 23 may be less than the minimum established by industry practice. For example, nine or seven or five capacitor units 25 may be connected in parallel in each series group 22 and 23 in the example above having seven series groups without endangering any of the remaining capacitor units in the event that one capacitor unit of a series group fails.

Since the halves 16 and 17 of the split Y capacitor bank are similar and the impedance of the phases 18, 19 and 20 in the two bank halves 16 and 17 are equal, the voltage of the neutrals 30 and 31 of the two halves 16 and 17 will be equal under normal conditions. If one of the individual fuses 26 operates as a result of failure of a capacitor unit 25, the impedance of the series group containing the faulted capacitor changes so that the voltage of the neutrals 30 and 31 will no longer be equal and unbalance detecting means connected between the two neutrals utilizes this change in voltage to provide protection against overvoltage on the remaining capacitor units 25. In the capacitor bank illustrated in Fig. 1, the unbalanced impedance of one bank half 16 with respect to the other bank half 17 causes current to flow between the neutrals 30 and 31, and current sensitive unbalance detecting means may include a current transformer 33 connected between the neutrals 30 and 31 of the split Y bank. The secondary 34 of the current transformer 33 energizes the operating winding 36 of a first current sensitive relay 37 and the operating winding 39 of a second current sensitive relay 40.

Although the invention has been shown and described utilizing a current transformer 33 between the split Y bank neutrals 30 and 31, it will be understood that the unbalance detecting means of the invention also comprehends the use of a potential transformer between the neutrals 30 and 31 or between any points which are at the same potential under normal conditions.

First current sensitive relay 37 only operates in the event of a severe bank unbalance such as a phase to neutral fault or the permanent shorting of an entire series group 22 or 23, for example, by a fallen conductor or other foreign object. Accordingly, first current sensitive relay 36 is of the slow-to-operate type which will not operate during the few cycles required to blow a fuse 26 during which few cycles the entire series group 22 or 23 is shorted out by a faulted capacitor unit and the voltage across the corresponding series group falls substantially to zero. Further, relay 37 is adjusted so that it will not operate on the unbalance current between neutrals 30 and 31 resulting from failure of a single capacitor unit 25 in a series group 22 or 23 and operation of the fuse 26 in series with the failed capacitor unit, but so that it will operate on the unbalance current flowing between neutrals 30 and 31 resulting from the shorting out of an entire series group 22 or 23 for a length of time greater than that required to operate a fuse 26.

Operation of current sensitive relay 37 closes a pair of normally open contacts 42 and 43 to complete an energizing circuit over lead 44 to the trip coil 12 of the circuit breaker 11 to thus disconnect the capacitor bank from the power line.

Second current sensitive relay 40 is adjusted to operate on a predetermined unbalance current flowing between neutrals 30 and 31, e.g. on the current which flows between neutrals 30 and 31 when a predetermined overvoltage, for example 10% of rated voltage, appears across any series group 22 or 23. In operating, relay 40 closes a first pair of normally open contacts 45 and 46 to complete a circuit to a suitable signal device, e.g. lamp 47, to provide a visual indication of the relay operation. If desired, the relay 40 may be provided with suitable latching means (not shown) to hold it in the actuated position so that the lamp 47 will continue to be lighted. It will also be understood that any other suitable indicating means may be used in place of, or in addition to, the lamp 47 to provide an indication when relay 40 operates.

In operating, second current sensitive relay 40 also actuates a suitable time delay device 53 including a reversible shaded pole motor 52 having a field winding 51 energized from a suitable source of alternating current power. As illustrated in the drawing, relay 40 closes normally open contacts 49 and 50 of a set of break-make contacts to complete a short circuit around the winding 48 of shaded pole motor 52, thereby causing the motor armature to rotate shaft 54 in the forward, or arrow, direction at a reduced rate, as for example by the gearing 55. Fastened to the shaft 54 is a disk 56 having holes 57 at intervals around its circumference in any one of which may be suitably fastened an operating member 58. Upon rotation of the disk 56 for a predetermined time dependent upon the hole 57 in which the operating member 58 has been placed, the operating member 58 will close the normally open contacts 59 and 60 to complete an energizing circuit over the lead 61 to the trip coil 12 of the circuit breaker 11 and disconnect the capacitor bank from the power system 10.

As shown in Fig. 3, standard capacitor units can safely withstand 60 cycle overvoltages up to 70% of rated voltage for short time intervals of one minute or longer without damage. As an example, failure of one capacitor unit in a capacitor bank having seven series groups with five paralleled capacitors in each series group will result in an overvoltage of approximately 22% of rated voltage on the remaining capacitors, and as can be seen from Fig. 3 the remaining capacitors in the group having the faulty capacitor can withstand this 22% overvoltage for approximately 200 minutes without damage. In accordance with the invention, the operating member 58 is placed in a hole 57 in disk 56 which will provide a time delay before operation of contacts 59 and 60 which is a function of, but slightly less than, that time interval which will damage the remaining units when subjected to the overvoltage resulting from failure of a single capacitor in the series group. In other words, the operating member 58 is fastened in a suitable hole 57 so that the device 53 including motor 52 will provide a time delay of 200 minutes or less in the example described above before closing contacts 59 and 60 to complete an energizing circuit to trip coil 12 and thus disconnect the capacitor bank from the power system.

The time delay device 53 is thus adjusted to provide a time delay which is coordinated with and a function of the permissible time overvoltage characteristic of the capacitor units as shown in Fig. 3. As a further example, if a capacitor bank has three series groups with four paralleled capacitor units in each series group, failure of a single capacitor unit will result in an overvoltage of approximately 24% of rated voltage on the remaining capacitors, and it will be apparent from Fig. 3 that the remaining capacitors can safely withstand this overvoltage for approximately 170 minutes. Consequently, in such capacitor bank the operating member 58 would be fastened in a hole 57 in disk 56 that would provide a time delay of 170 minutes or less before contacts 59 and 60 are closed to trip the circuit breaker 11. If conventional protecting means were utilized in a capacitor bank having such number of capacitor units in parallel in each series group, the bank would be immediately removed from the power system upon failure of one capacitor, whereas in accordance with the invention the capacitor bank remains energized following a capacitor failure for a length of time which is a function of the permissible time overvoltage characteristics of the capacitor units, thus providing the required kilovar capacity to the power system during the peak period and possibly allowing servicing to be withheld until an off-peak period.

Also mounted on shaft 54 is a cam 63 for operating a switch 64 having a pair of contacts which are open when shaft 54 is in the initial, or starting, position. When reversible shaded pole motor 52 rotates shaft 54 in the forward, or arrow, direction, a lobe on cam 63 closes the contacts of switch 64 to prepare a circuit to short circuit winding 65 of shaded pole motor 52. As long as relay 40 remains operated, contacts 50 and 66 remain disengaged and keep the circuit to winding 65 open. However, if relay 40 is released before the predetermined time delay required to rotate disk 56 until contacts 59 and 60 are closed, the normally closed contacts 50 and 66 engage to complete a short circuit around winding 65 and causing reversible shaded pole motor 52 to drive shaft 54 in the reverse direction, i.e. against the arrow. When shaft 54 is returned to the starting position, a follower on switch 64 falls into a reduced diameter portion of cam 63 to open the contacts of switch 64, thus removing the short circuit on winding 65 and stopping the reverse rotation of motor 52.

Relay 40 releases whenever the voltage of neutrals 30 and 31 become equal, and this may result when a temporary fault clears or when the capacitor bank is removed from the power system manually or by automatic control means. Thus relay 40 may release before the motor driven time delay 53 has been energized for a sufficient length of time to operate contacts 59 and 60 and thus trip circuit breaker 11. For example, if the switching of the capacitor bank is controlled by a time clock, the bank may be switched off the power system before the elapse of the predetermined time delay required to close contacts 59 and 60, in which event relay 40, in releasing and closing contacts 50 and 66, short circuits winding 65, thereby rotating the motor armature in the reverse direction until shaft 54 is returned to the starting position. Consequently, the invention permits operating the capacitor bank, without damaging the capacitor units, for even longer periods of time before replacing a failed capacitor than that shown by the permissible overvoltage-time characteristic of the capacitor units. For example, if the capacitor bank had nine series groups per phase with seven paralleled capacitors in each series group, failure of one capacitor unit in a series group would result in an overvoltage of approximately 15% of rated voltage on the remaining capacitor units, and Fig. 3 shows that the capacitor units can safely withstand this overvoltage for approximately 16 hours. Operating member 58 would be fastened in the hole 57 in disk 56 which would provide a time delay of somewhat less than 16 hours before contacts 59 and 60 are closed to trip circuit breaker 11, and if the time delay device were only capable of rotating shaft 54 in one direction, the capacitor bank would automatically be removed from the power system after this length of time elapsed, and it would be necessary to replace the faulty capacitor unit before the bank could again be operated. However, inasmuch as the time delay device is reversible, if the capacitor bank is controlled by time clock means which energizes the capacitor bank for only 12 hours at a time, even though the capacitor units were subjected to an overvoltage of 15% of rated voltage, the contacts 59 and 60 would never be operated before the automatic time clock control means would trip the circuit breaker 11. The capacitor bank could thus be safely operated for an indefinite period of time without having to replace the failed capacitor even though the overvoltage on the remaining capacitors was greater than 10% of rated voltage, at which overvoltage industry practice requires that the bank be removed from the power system and the failed units replaced.

While the time delay device has been illustrated and described as including a shaded pole electric motor, it will be appreciated that time delay relays of the synchronous motor type having a first winding for operating the motor armature in a forward direction and a second winding for operating the armature in the reverse direction can also be utilized to accomplish the results of the invention, and further that time delay devices of other than the electric motor type are also suitable to provide the improved results of the invention.

It will be apparent that capacitor banks having unbalance detecting protective means in accordance with the invention can be constructed with a connected kilovar capacity which is considerably less than the minimum size of bank which must be adhered to in accordance with industry practice.

Although the preferred embodiment of the invention has been illustrated and described with reference to a split Y bank wherein the unbalance detecting means is connected between the neutrals of the bank halves, it will be apparent that the unbalance detecting protective means of the invention is equally adapted to be connected between equipotential points in any capacitor bank having similar branches connected in shunt to the power system.

Figure 2:
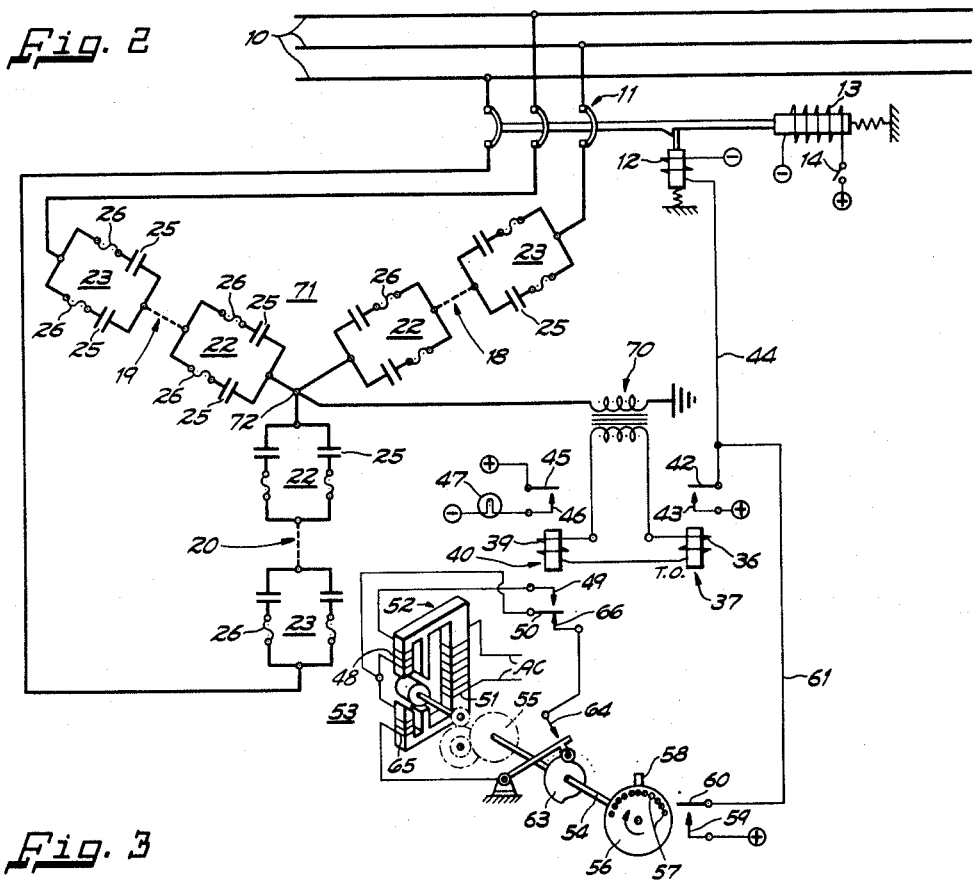
Fig. 2 is a schematic circuit diagram of a capacitor bank utilizing neutral-to-ground unbalance detecting means embodying the invention; and, Fig. 3 is a curve illustrating permissible 60 cycle overvoltage for power factor correcting capacitor units plotted against duration of overvoltage.

Fig. 2 shows an alternative embodiment of the invention wherein the unbalance detecting means including a potential transformer 70 is connected between the floating neutral of a capacitor bank 71 and ground. It will be apparent that failure of any capacitor unit 25 in the capacitor bank 71 will cause shift of the neutral 72, and this change in voltage distribution is utilized to provide protection against overvoltage on any group of capacitors in a manner identical to that described for the embodiment of Fig. 1.

In operation, upon severe bank unbalance incident to a phase-to-neutral fault or a sustained short circuit on one complete series group 22 or 23 resulting from a fallen conductor or other foreign object, the relay 37 operates to energize the trip coil 12 and disconnect the capacitor bank from the power system. The relay 37 is of the slow-to-operate type and will not operate in the few cycles required to operate a fuse 26 after failure of a capacitor unit 25. However, relay 40 will operate if the overvoltage on the remaining capacitors of a series group after failure of a single capacitor unit 25 of said series group is above a predetermined magnitude, e.g. 10% of rated voltage, and relay 40 in operating will actuate time delay device 53. The time delay device 53 is adjusted to operate after an interval which is a function of the permissible time which the capacitor units 25 can safely withstand the overvoltage resulting from failure of a single capacitor unit 25 in a series group, thereby permitting the capacitor bank to continue to supply the needed kilovars to the power system during the peak period and permitting servicing and removal of the faulty capacitor during an off-peak period. Operation of circuit breaker 11 either manually or automatically to disconnect the capacitor bank from the power system releases relay 40 which permits contacts 50 and 66 to engage and short circuit winding 65 to drive shaded pole motor armature in the reverse direction back to the starting position in a manner similar to that described for the embodiment of Fig. 1.

It will be apparent that the invention will permit construction of completely protected capacitor banks of kilovar capacity considerably smaller than the minimum size required by industry practice. Although only two embodiments of the invention have been illustrated and described, many modifications and variations thereof will be obvious to those skilled in the art, and consequently it is intended in the appended claims to cover all such modifications and variations as fall within the true spirit and scope of the invention.

What we claim as new and desire to secure by Letters Patent of the United States is:

1. A capacitor bank having a plurality of series groups of paralleled capacitors connected in shunt to an electrical power system, the length of time that each of said capacitors can safely withstand an overvoltage varying with the magnitude of said overvoltage, an individual fuse in series with each of said capacitors, means for connecting said capacitor bank to and disconnecting it from said power system, and unbalance detecting means connected between points in said capacitor bank which are at the same potential under normal operating conditions for actuating said disconnecting means and being operable in response to an unbalance voltage existing between said normally equipotential points for an interval which is a function of the time that the remaining capacitors in one of said series groups can safely withstand the overvoltage resulting from failure of one of the capacitors of said one group and also being operable in response to an unbalance voltage existing between said normally equipotential points at least equal to that resulting from the short circuiting of one of said series groups for a duration greater than that required to operate one of said fuses when the capacitor in series therewith fails.

2. A capacitor bank including a plurality of similar branches each of which has a plurality of series connected groups of paralleled capacitor units, an individual fuse in series with each of said capacitor units, means for connecting said branches in shunt to and for disconnecting them from an alternating current power line, the arrangement being such that upon failure of a capacitor unit in one of said series groups a first predetermined overvoltage appears across the remaining series groups for a predetermined time required to operate the fuse in series with the failed capacitor, the number of capacitor units in parallel in each series group being such that a second predetermined voltage, in excess of that voltage which if continuously applied would damage said capacitor units, appears across the remaining capacitor units of said one series group after said fuse operates, first and second unbalance detecting means connected between points of said capacitor bank which are at the same potential under normal operating conditions for operating said means for disconnecting said branches from said power line, said first means being responsive to a voltage between said normally equipotential points at least equal to that resulting from said first predetermined voltage appearing across one of said series groups for an interval greater than said predetermined time, said second means being operable in response to an unbalance voltage between said normally equipotential points at least equal to that resulting from said second predetermined overvoltage existing across one of said series groups, said second means having a time delay in operation which is a function of the time said capacitor units can safely withstand said second predetermined voltage.

3. In combination, a capacitor bank including a plurality of similar branches each having a plurality of series connected groups of paralleled capacitor units, an individual fuse in series with each of the capacitor units, means for connecting said branches in shunt to and for disconnecting them from an alternating current power line, the number of capacitor units in each series group being such that a first predetermined voltage, in excess of that voltage which if continuously applied would damage said capacitor units, appears across the remaining capacitors in the event that one capacitor unit of said series group fails and the fuse in series with the failed unit operates, unbalance detecting means connected between points of said capacitor bank which are normally at the same potential, said unbalance detecting means including a first relay responsive to a voltage unbalance between said normally equipotential points of a magnitude at least equal to that resulting from short circuiting one of said series groups and for a time interval greater than that required to operate one of said fuses, a second relay responsive to a predetermined voltage unbalance between said normally equipotential points, and time delay means operable by said second relay after an interval which is a function of the time interval that said capacitor units can safely withstand said first predetermined overvoltage, said first and second relays being adapted when operated to actuate said means to disconnect the capacitor bank from said power line.

4. A capacitor bank having a plurality of series groups of paralleled capacitors connected in shunt to an electrical power system, the length of time that each of said capacitors can safely withstand an overvoltage varying with the magnitude of said overvoltage, and unbalance detecting protective means connected between points in said capacitor bank which are at the same potential under normal operating conditions for removing said capacitor bank from said power system, said means having a time delay in operation which is a function of the time interval that the remaining capacitors in one of said series groups can safely withstand the overvoltage resulting from failure of one of the capacitors of said one series group.

5. A capacitor bank having a plurality of series groups of paralleled capacitors connected in shunt to an electrical power system, the overvoltage which each of said capacitors can safely withstand varying with the duration of said overvoltage along a permissible overvoltage-time characteristic, and unbalance detecting protective means connected between points in said capacitor bank which are at the same potential under normal operating conditions for removing said capacitor bank from said power system, said means having a time delay in operation which is a function of said permissible overvoltage-time characteristic.

6. A capacitor bank having a plurality of series groups of paralleled capacitors connected in shunt to an electrical power system, the length of time that each of said capacitors can safely withstand an overvoltage varying with the magnitude of said overvoltage along a permissible overvoltage-time characteristic, and unbalance detecting protective means connected between points in said capacitor bank which are at the same potential under normal operating conditions including time delay means operable from an initial position in one direction to complete an electrical circuit to remove said capacitor bank from said power system, said time delay means having a time delay in operation which is a function of the time interval that the remaining capacitors in one of said series group can safely withstand the overvoltage resulting from failure of one of the capacitors in said one seires group, and means operable upon removal of said capacitor bank from said power system for returning said time delay means in the opposite direction to said initial position.

7. In a capacitor bank in accordance with claim 6 wherein an individual fuse is connected in series with each of said capacitors and said unbalance detecting protective means includes relay means operable to remove said capacitor bank from said power system in response to an unbalance voltage existing between said points at least equal to that resulting from the short circuiting of one of said series groups and for a time interval greater than that required to operate one of said fuses when the capacitor in series therewith fails.

8. A capacitor bank having a plurality of series groups of paralleled capacitors connected in shunt to an electrical power system, the length of time that each of said capacitors can safely withstand an overvoltage varying with the magnitude of said overvoltage, an individual fuse in series with each of said capacitors, means for connecting said capacitor bank to and disconnecting it from said power system, unbalance detecting means for operating said disconnecting means and including a transformer connected between points in said capacitor bank which are at the same potential under normal operating conditions and first and second time delay relays energized from the secondary of said transformer, said first relay being operable in response to an unbalance voltage existing between said normally equipotential points for an interval which is a function of the time that the remaining capacitors of one of said series groups can safely withstand the overvoltage resulting from failure of a capacitor in said one group, said second relay being operable in response to an unbalance voltage existing between said normally equipotential points at least equal to that resulting from the short circuiting of one of said series groups for an interval greater than that required to operate one of said fuses when a capacitor unit in series therewith fails.

9. A capacitor bank adapted to be connected in shunt to an alternating current power line, said capacitor bank including a plurality of similar branches each of which comprises a plurality of series connected groups of paralleled capacitor units, an individual fuse in series with each of the capacitor units, means for connecting said branches in shunt to and for disconnecting them from said power line, the number of capacitor units in parallel in each series group being such that a predetermined voltage, in excess of that voltage which if continuously applied would damage the capacitor units, appears across the remaining capacitor units in the event that one capacitor unit of said series group fails and the fuse in series with the failed unit operates, first and second unbalance detecting means connected between points in said branches which are at the same potential under normal conditions for actuating said means for disconnecting said branches from said power line, said first means being responsive to an unbalance between said points at least equal to that resulting from short circuiting one of said series groups and for an interval greater than the time required to operate one of said fuses after failure of the capacitor unit in series with said fuse, said second means including a relay operable in response to a predetermined unbalance voltage existing between said points and means actuated by said relay and operable after a time delay which is a function of the time interval that said capacitor units can safely withstand said predetermined voltage.

10. A capacitor bank adapted to be connected in shunt to an alternating current power line, said capacitor bank including a plurality of similar branches each of which comprises a plurality of series connected groups of paralleled capacitor units, an individual fuse in series with each of the capacitor units, means for connecting said branches in shunt to and for disconnecting them from said power line, the arrangement being such that upon failure of a capacitor unit in one of said series groups a first predetermined overvoltage is impressed across each remaining series group for a predetermined time required to operate the fuse in series with the failed unit, the number of capacitor units in parallel in each series group being such that a second predetermined overvoltage, in excess of that voltage which if continuously applied would damage said capacitor units, appears across the remaining capacitors of said one series group after said fuse operates, means connected between points in said capacitor bank which are at the same potential under normal conditions and responsive to a voltage unbalance between said normally equipotential points of a magnitude at least equal to that resulting from said first predetermined overvoltage being impressed across one of said series groups for an interval greater than said predetermined time for operating said means for disconnecting the capacitor bank from the power line, and time delay means responsive to a predetermined voltage unbalance between said normally equipotential points for operating said disconnecting means, said time delay means being operable after a predetermined time delay which is a function of the permissible time which said capacitor units can be safely subjected to said second predetermined overvoltage.

11. A capacitor bank having a plurality of series groups of paralleled capacitors connected in shunt to an alternating current electrical power system, the overvoltage that each of said capacitors can safely withstand varying with the duration of said overvoltage along a permissible overvoltage-time characteristic, unbalance detecting protective means connected between points in said capacitor bank which are at the same potential under normal operating conditions operable from an initial position in response to an unbalance voltage existing between said normally equipotential points for disconnecting said capacitor bank from said power system, said means having a time delay in operation which is a function of said permissible overvoltage-time characteristic, and means operable in response to the removal of said unbalance voltage between said points for returning said unbalance detecting protective means to said initial position.

References Cited in the file of this patent

UNITED STATES PATENTS

| | | |
|---|---|---|
| 2,246,324 | Schrader | June 17, 1941 |
| 2,372,134 | Steeb | Mar. 20, 1945 |
| 2,447,658 | Marbury | Aug. 24, 1948 |
| 2,544,519 | Wood | Mar. 6, 1951 |